(12) United States Patent
Wu et al.

(10) Patent No.: US 9,904,112 B2
(45) Date of Patent: Feb. 27, 2018

(54) COMPOSITION, ALIGNMENT LAYER AND METHOD FOR PREPARING SAME, LIQUID CRYSTAL ALIGNMENT UNIT AND LIQUID CRYSTAL DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Jianyun Xie, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 36 days.

(21) Appl. No.: 14/528,372

(22) Filed: Oct. 30, 2014

(65) Prior Publication Data

US 2015/0362802 A1    Dec. 17, 2015

(30) Foreign Application Priority Data

Jun. 11, 2014  (CN) .......................... 2014 1 0258177

(51) Int. Cl.
  *C09K 19/00*       (2006.01)
  *G02F 1/1337*     (2006.01)
  (Continued)

(52) U.S. Cl.
  CPC .... *G02F 1/133711* (2013.01); *C09K 19/2021* (2013.01); *G02F 1/133753* (2013.01);
  (Continued)

(58) Field of Classification Search
  CPC ......... G02F 1/133711; G02F 1/133788; G02F 2001/133757; C07C 69/54;
  (Continued)

(56) References Cited

U.S. PATENT DOCUMENTS 5,560,864 A * 10/1996 Goulding .............. C07C 43/215
  252/299.01
6,136,225 A * 10/2000 Meyer ..................... C07C 69/96
  106/401

(Continued)

FOREIGN PATENT DOCUMENTS

CN        1669191 A      9/2005
CN      101825807 A      9/2010
(Continued)

OTHER PUBLICATIONS

Notification of the First Office Action dated May 5, 2015 corresponding to Chinese application No. 201410258177.1.

*Primary Examiner* — Ruiyun Zhang
(74) *Attorney, Agent, or Firm* — Nath, Goldberg & Meyer; Joshua B. Goldberg; Annie J. Kock

(57) ABSTRACT

A composition, an alignment layer and a method for preparing the same, a liquid crystal alignment unit and a liquid crystal display panel are provided. The composition comprises a nematic liquid crystal polymerizable monomer and a cholesteric liquid crystal polymerizable monomer. The composition can be used for solving the drawbacks existing in the multi-domain display field, such as complex manufacturing processes, high cost, and difficult to be manufactured. The composition allows controlling the alignment of the molecules in the surface of the coating of the composition through adjusting the amounts of the components in the composition and through adjusting the thickness of the coating. The alignment layer, the liquid crystal alignment unit, and the liquid crystal display panel according to the (Continued)

present invention can be prepared by using a simple process and allow to achieve a multi-domain display at a lower cost.

13 Claims, 4 Drawing Sheets

(51) Int. Cl.
  *C09K 19/20* (2006.01)
  *C09K 19/04* (2006.01)
  *G02F 1/137* (2006.01)

(52) U.S. Cl.
  CPC .......... *G02F 1/133788* (2013.01); *C09K 2019/0448* (2013.01); *C09K 2019/2078* (2013.01); *C09K 2219/03* (2013.01); *G02F 1/13718* (2013.01); *G02F 2001/133715* (2013.01); *G02F 2001/133726* (2013.01); *G02F 2001/133757* (2013.01); *Y10T 428/1005* (2015.01)

(58) Field of Classification Search
  CPC ............ C09K 19/3809; C09K 19/3838; C09K 19/3852; C09K 19/42; C09K 19/46; C09K 2219/03; C09K 2019/0448; C09K 2019/2078; Y10T 428/1005; Y10T 428/1036; C07D 493/04
  USPC ...... 428/1.2, 1.3; 349/88, 93, 123, 127, 183, 349/185, 186; 252/299.64, 299.67, 299.7; 526/319
  See application file for complete search history.

(56) References Cited

U.S. PATENT DOCUMENTS 6,723,395 B2 * 4/2004 May .................... C07D 493/04
                                                        252/299.2
2010/0117027 A1 5/2010 Hirai et al.

FOREIGN PATENT DOCUMENTS

| CN | 102053424 A | | 5/2011 |
| CN | 102508378 A | | 6/2012 |
| CN | 103275736 A | * | 9/2013 |

* cited by examiner

COMPOSITION, ALIGNMENT LAYER AND METHOD FOR PREPARING SAME, LIQUID CRYSTAL ALIGNMENT UNIT AND LIQUID CRYSTAL DISPLAY PANEL

FIELD OF THE INVENTION

The present invention relates to the technical field of displaying and, in particular, to a composition, an alignment layer and a method for preparing the same, a liquid crystal (LC) alignment unit and a liquid crystal display panel.

BACKGROUND OF THE INVENTION

LC display devices have been increasingly used in recent daily lives, such as mobile phone display screens, notebook display screens, GPS display screens, LCD TV display screens and the like. Along with the development of sciences and techniques, conventional mono-domain LC display devices could not meet the increasing requirements of LC display devices any more, due to their drawbacks including low contrast ratio, asymmetric viewing angle, shift in color when viewing images from various angles, and the like. Recently, multi-domain display technique has been widely used in the display field, because it can improve the asymmetric viewing angle of LC display devices, increase the viewing angle, enhance the contrast ratio, improve the grayscale reversal, effectively improve the color shift, and the like.

Many patent literatures have disclosed the studies conducted for the purpose to achieve the multi-domain display of LC display devices. For example, one way to achieve the multi-domain display includes dividing a pixel of a LC display device into four sub-pixels, and then rubbing respectively in the four sub-pixel regions to make LC molecules form different primary alignments, which will form a multi-domain state when a voltage is applied. Alternatively, the multi-domain display may be achieved by preparing several protrusions under the pixel electrode, and establishing an oblique electric field between the pixel electrode having a particular shape and the common electrode on the upper glass substrate to align LC molecules along the electric field direction to form a multi-domain state. Also, the multi-domain display may be achieved by configuring a multi-domain type pixel electrode. However, the manufacturing process of the multi-domain film LC display device is complicated and difficult, and the manufacturing cost is expensive.

The conventional method which achieves multi-domain display by forming different primary alignments of LC molecules in a pixel through a rubbing alignment technique involves complicated manufacturing process and relatively high cost, and it is not so easy to achieve the desired effect.

SUMMARY OF THE INVENTION

An object of the present invention is to provide a composition, an alignment layer formed from the composition and a method for preparing the same, a LC alignment unit and a LC display panel, so as to solve the problems existing in the prior methods for achieving of multi-domain display of LC display devices, such as complex manufacturing processes, high cost, difficult to be manufactured, and the like.

The object is achieved by a composition comprising a nematic LC polymerizable monomer and a cholesteric LC polymerizable monomer.

It has been found by the inventors that when a nematic LC polymerizable monomer is used in combination with a cholesteric LC polymerizable monomer for preparing an alignment layer of a LC display panel or a LC alignment unit, an alignment layer having a plurality of alignment regions different in alignment direction can be easily obtained, thereby allowing multi-domain display.

The alignment directions of the LC alignment unit can be controlled by modifying the ratio of the nematic LC polymerizable monomer to the cholesteric LC polymerizable monomer in the composition, as well as the thickness of the resultant alignment layer.

The cholesteric LC polymerizable monomer useful for the present invention comprises at least two carbon-carbon double bonds (i.e., C═C) per molecule, can exhibit a cholesteric phase within a certain temperature range and can be subjected to a polymerization reaction upon exposure to a light irradiation, typically a UV light irradiation.

Preferably, the cholesteric LC polymerizable monomer is 1,4-bis(4-(3'-methyl-6'-acryloxy hexyloxy)benzoyloxy)benzene, as represented by the following formula I:

Formula I

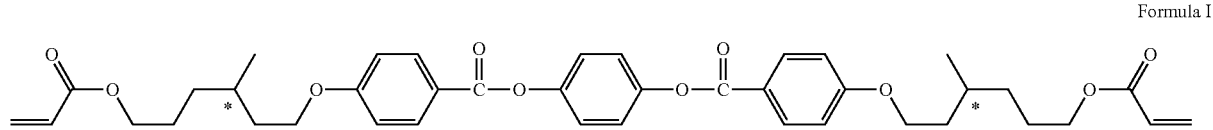 [SMILES: C=CC(=O)OCCCC(C)CCOc1ccc(C(=O)Oc2ccc(OC(=O)c3ccc(OCCC(C)CCCOC(=O)C=C)cc3)cc2)cc1]

The nematic LC polymerizable monomer useful for the present invention comprises at least two C═C bonds per molecule and can be subjected to a polymerization reaction upon exposure to a light irradiation, typically a UV light irradiation.

Preferably, the nematic LC polymerizable monomer is 1,4-bis(4-(6'-acryloxy hexyloxy)benzoyloxy)-2-toluene, as represented by the following formula II:

Formula II

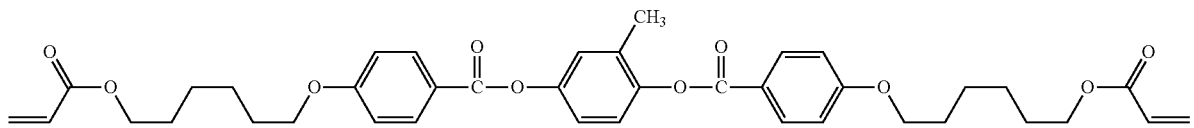

Preferably, the mass ratio of the cholesteric LC polymerizable monomer to the nematic LC polymerizable monomer in the composition may be in the range of 5/95-95/5, for example, 10/90-90/10, 20/80-80/20, 30/70-70/30, and the like.

The composition of the present invention may further comprise a photoinitiator. The amount of the photoinitiator in the composition is such an amount that is effective to allow the polymerizable monomers in the composition to be polymerized upon light irradiation. For example, the amount of the photoinitiator is 1-10%, 2-9%, 3-7%, preferably 5%, based on the total mass of the cholesteric LC polymerizable monomer and the nematic LC polymerizable monomer.

The photoinitiator in the present invention preferably is a UV photoinitiator.

Preferably, the photoinitiator is benzil dimethyl ketal, as represented by the following formula III:

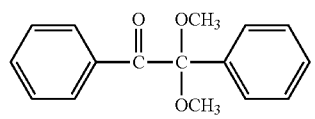

Formula III

The composition of the present invention may further comprise a solvent for dissolving the components in the composition. As the solvent, any common organic solvent known in the art may be used, as long as the solvent can dissolve the components in the composition.

Examples of the solvent may include alcohols, such as methanol and ethanol; ethyl acetate; methylene chloride; and the like.

Another aspect of the present invention is to provide an alignment layer prepared from the composition as described above upon polymerization.

The alignment layer of the present invention may comprise a plurality of alignment regions, wherein the adjacent alignment regions are different in alignment direction.

Yet another aspect of the present invention is to provide a method for preparing an alignment layer as described above, comprising the following steps:

1) Mixing

In this step, the cholesteric LC polymerizable monomer, the nematic LC polymerizable monomer and the photoinitiator are mixed together in a predetermined ratio to form a composition. A solvent may be used for dissolving those components. As the solvent, any common organic solvent known in the art may be used, as long as the solvent can dissolve the components in the composition. Examples of the solvent may include alcohols, such as methanol and ethanol; ethyl acetate; methylene chloride; and the like.

2) Coating

In this step, the composition is coated onto a substrate, so as to form a film of the composition.

The coating operation can be carried out by any coating techniques known in the art, such as a transfer coating technique, a spin coating technique, and the like. The thickness of the film can be controlled by adjusting the concentrations of the respective components in the composition and the operation parameters of the coating process. For example, in the case of the transfer coating process, the thickness of a film can be adjusted by controlling the coating speed. In the case of the spin coating process, the coating device can be selected according to the size of the substrate used, and the thickness of a film can be adjusted by controlling the rotating speed. The thickness of the film may vary depending upon intended applications. For example, the thickness of the film may be in the range of 100-2000 nm, 200-600 nm, 100-300 nm, 120-250 nm, and the like.

3) Crosslinking reaction

In this step, the cholesteric LC polymerizable monomer and the nematic LC polymerizable monomer are crosslinked under a light irradiation, typically UV light irradiation, to produce a cholesteric LC polymer, thereby obtaining a film of the composition of the present invention.

The light irradiation preferably is a UV light irradiation. More preferably, the UV light irradiation is performed at a wavelength of 365 nm and a luminous intensity of 5 mw/cm$^2$.

Preferably, the mass ratio of the cholesteric LC polymerizable monomer to the nematic LC polymerizable monomer is in the range of 5/95-95/5, for example, 10/90-90/10, 20/80-80/20, 30/70-70/30, and the like.

The amount of the photoinitiator in the composition is effective to allow the polymerizable monomers in the composition to be polymerized upon light irradiation. For example, the amount of the photoinitiator is 1-10%, 2-9%, 3-7%, preferably 5%, based on the total mass of the cholesteric LC polymerizable monomer and the nematic LC polymerizable monomer.

The photoinitiator in the present invention preferably is a UV photoinitiator.

Preferably, the photoinitiator is benzil dimethyl ketal, as represented by the following formula III:

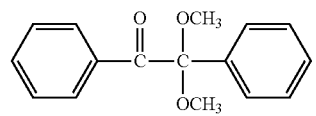

Formula III

Yet another aspect of the present invention is to provide a LC alignment unit comprising an alignment layer as described above and a substrate, wherein the alignment layer is disposed on the substrate.

Preferably, the alignment layer may comprise a plurality of alignment regions, wherein the adjacent alignment regions are different in alignment direction.

Preferably, the alignment layer comprises a first alignment sublayer having a first alignment direction and a second alignment sublayer having a second alignment direction, wherein the first alignment sublayer comprises a plurality of alignment regions, the second alignment sublayer is disposed on the substrate, the plurality of alignment regions of the first alignment sublayer are separated from each other and arranged on the surface of the second alignment sublayer opposite to the substrate. The first alignment direction of the first alignment sublayer is different from the second alignment direction of the second alignment sublayer. At least one of the first alignment sublayer and the second alignment sublayer is prepared from the composition of the present invention.

Alternatively, the alignment layer comprises a first alignment sublayer having a first alignment direction and a second alignment sublayer having a second alignment direction, wherein the first alignment sublayer comprises a plurality of alignment regions and the second alignment sublayer comprises a plurality of alignment regions, wherein the plurality of alignment regions of the first alignment sublayer and the plurality of alignment regions of the second alignment sublayer are arranged alternately on the same surface of the substrate. The first alignment direction of the first alignment sublayer is different from the second alignment direction of the second alignment sublayer. At least one of the first alignment sublayer and the second alignment sublayer is prepared from the composition of the present invention.

Yet another aspect of the present invention is to provide a LC display panel comprising an array substrate, a color filter substrate and a LC layer provided between the array substrate and the color filter substrate, wherein a LC alignment unit as described above is provided on the side of the array substrate and/or the color filter substrate in contact with the LC layer.

The composition of the present invention allows controlling the alignment of the molecules in the surface of the coating of the composition through adjusting the amounts of the components in the composition and adjusting the thickness of the coating of the composition, so as to prepare an alignment layer from the composition, in which the adjacent alignment regions are different in alignment direction. Thus, a multi-domain display can be easily achieved.

The alignment layer, the LC alignment unit, and the LC display panel according to the present invention can be prepared by using a simple process and allow to achieve a multi-domain display at a lower cost.

DETAILED DESCRIPTION OF CERTAIN EMBODIMENTS

Figure 1:
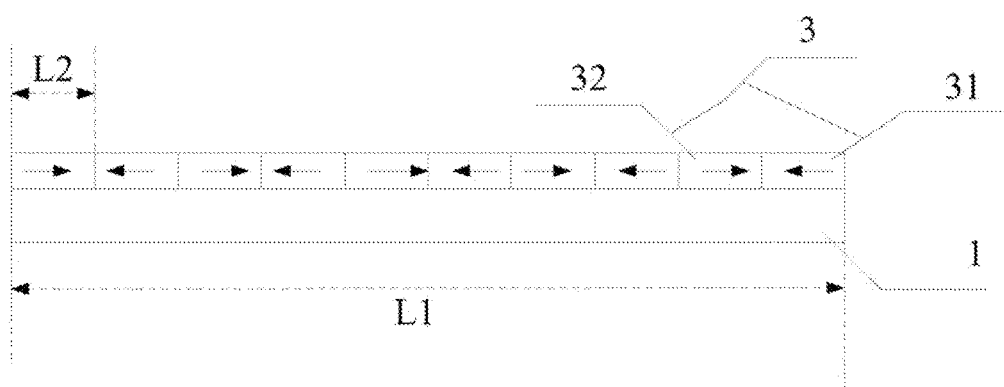
FIG. 1 is a schematic diagram of a LC alignment unit comprising an alignment layer according to an embodiment of the present invention, wherein a first alignment sublayer consists of a plurality of alignment regions 31, a second alignment sublayer consists of a plurality of alignment regions 32, and the alignment regions 31 and the alignment regions 32 are arranged alternately on a glass substrate 1.

Next, the present invention will be described in detail with reference to the drawings and below examples, which are not intended to limit the scope of the present invention.

Definitions

An alignment direction of an alignment layer refers to the direction of alignment of the molecules in the surface of the alignment layer.

According to the present invention, at least a part of the alignment layer is prepared from the composition of the present invention.

According to the present invention, the number of domains refers to the number of alignment regions that directly contact with LC molecules and consist of adjacent alignment regions with different alignment directions.

Composition

In one aspect, the present invention provides a composition comprising a nematic LC polymerizable monomer and a cholesteric LC polymerizable monomer.

The cholesteric LC polymerizable monomer useful for the present invention comprises at least two C=C bonds per molecule, can exhibit a cholesteric phase within a certain temperature range and can be subjected to a polymerization reaction upon exposure to a light irradiation, typically a UV light irradiation.

Preferably, the cholesteric LC polymerizable monomer is 1,4-bis(4-(3'-methyl-6'-acryloxy hexyloxy)benzoyloxy)benzene, as represented by the following formula I:

Formula I

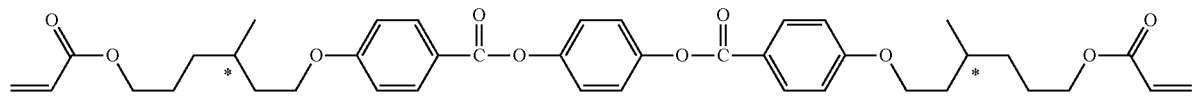

Preferably, the nematic LC polymerizable monomer useful for the present invention comprises at least two C=C bonds per molecule and can be subjected to a polymerization reaction upon exposure to a light irradiation, typically a UV light irradiation.

Preferably, the nematic LC polymerizable monomer is 1,4-bis(4-(6'-acryloxy hexyloxy)benzoyloxy)-2-toluene, as represented by the following formula II:

Formula II

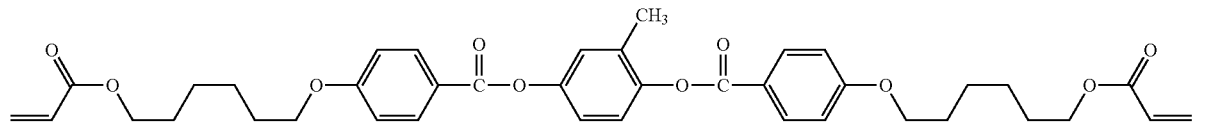

Preferably, the mass ratio of the cholesteric LC polymerizable monomer to the nematic LC polymerizable monomer in the composition is in the range of 5/95-95/5, for example, 10/90-90/10, 20/80-80/20, 30/70-70/30, and the like.

The mass ratio of said polymerizable monomers may be determined according to intended applications. For example, the mass ratio of said polymerizable monomers may be determined according to a desired pitch, for example, according to the following equation:

$$P=[(HTP) \cdot Xc]^{-1}$$

wherein:

P represents a pitch, HTP represents a helical twisting power (HTP) of a cholesteric LC polymerizable monomer, and Xc represents the content (mol %) of the cholesteric LC polymerizable monomer in the composition.

Preferably, the composition of the present invention may further comprise a photoinitiator. The amount of the photoinitiator in the composition is such an amount that is effective to allow the polymerizable monomers in the composition to be polymerized upon light irradiation. For example, the amount of the photoinitiator in the composition is 1-10%, 2-9%, 3-7%, preferably 5%, based on the total mass of the cholesteric LC polymerizable monomer and the nematic LC polymerizable monomer.

The photoinitiator in the present invention preferably is a UV photoinitiator.

Preferably, the photoinitiator is benzil dimethyl ketal, as represented by the following formula III:

Formula III

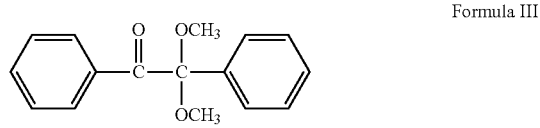

Since the cholesteric LC polymerizable monomer in the composition of the present invention is a chiral compound, the pitch (P) of the composition decreases (increases) with increasing (decreasing) of the amount of the cholesteric LC polymerizable monomer. When the thickness of an alignment layer formed from the composition is constant, P varies depending upon the amount of the cholesteric LC polymerizable monomer, resulting in changes of alignment direction of the molecules in the surface of the corresponding alignment layer, i.e., the alignment direction of the alignment layer changes. When the amount of the cholesteric LC polymerizable monomer in the composition is constant (i.e., P is constant), the alignment direction of the alignment layer varies depending upon the thickness of the alignment layer.

In sum, the alignment direction of the molecules in the surface of the alignment layer (i.e., the alignment direction of the alignment layer) prepared from the composition of the present invention can be controlled by modifying the amount of the cholesteric LC polymerizable monomer in the composition and the thickness of the alignment layer.

Alignment Layer

In another aspect, the present invention provides an alignment layer prepared from the composition as described above, wherein the alignment layer comprises a plurality of alignment regions, and the adjacent alignment regions are different in alignment direction.

An embodiment of the alignment layer according to the present invention is shown in FIG. 1. The alignment layer comprises a first alignment sublayer having a first alignment direction and a second alignment sublayer having a second alignment direction, wherein the first alignment sublayer comprises a plurality of alignment regions 31, and the second alignment sublayer comprises a plurality of alignment regions 32, wherein the plurality of alignment regions 31 of the first alignment sublayer and the plurality of alignment regions 32 of the second alignment sublayer are arranged alternately on the same surface of a substrate 1. The first alignment direction of the first alignment sublayer is different from the second alignment direction of the second alignment sublayer. At least one of the first alignment sublayer and the second alignment sublayer is prepared from the composition of the present invention.

Figure 2:
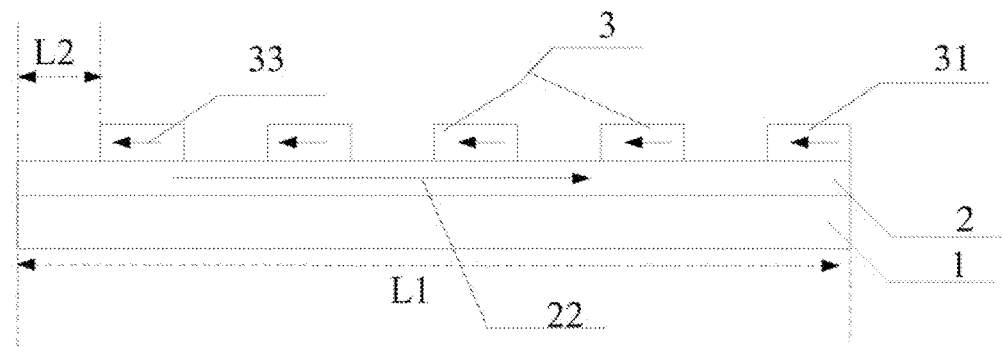
FIG. 2 is a schematic diagram of a LC alignment unit comprising a first alignment sublayer 3 and a second alignment sublayer 2 according to another embodiment of the present invention, wherein the first alignment sublayer 3 consists of a plurality of alignment regions 31.

Another embodiment of the alignment layer according to the present invention is shown in FIG. 2. The alignment layer comprises a first alignment sublayer 3 having a first alignment direction 33 and a second alignment sublayer 2 having a second alignment direction 22, wherein the first alignment sublayer 3 comprises a plurality of alignment regions 31, the second alignment sublayer 2 is disposed on a substrate 1, the plurality of alignment regions 31 of the first alignment sublayer 3 are separated from each other and arranged on the surface of the second alignment sublayer 2 opposite to the substrate 1 (i.e., the upper surface of the second alignment sublayer 2 shown in FIG. 2). The first alignment direction 33 of the first alignment sublayer 3 is different from the second alignment direction 22 of the second alignment sublayer 2. At least one of the first alignment sublayer 3 and the second alignment sublayer 2 is prepared from the composition of the present invention.

Furthermore, the alignment layer according to the present invention may comprise a third alignment sublayer or more alignment sublayers. The alignment layer according to the present invention has at least two alignment directions, for example, two, three or more alignment directions.

Method for Preparing the Alignment Layer

In yet another aspect, the present invention provides a method for preparing the alignment layer as described above, comprising the following steps:

1) Mixing

In this step, the cholesteric LC polymerizable monomer, the nematic LC polymerizable monomer and the photoinitiator are mixed together in a predetermined ratio to form a composition. A solvent may be used for dissolving those components. As the solvent, any common organic solvent known in the art may be used, as long as the solvent can dissolve the components. Examples of the solvent may include alcohols, such as methanol and ethanol; ethyl acetate; methylene chloride; and the like.

2) Coating

In this step, the composition is coated onto a substrate, so as to form a film of the composition.

The coating can be carried out by any coating techniques known in the art, such as a transfer coating technique, a spin coating technique, and the like. The thickness of the film may be adjusted by controlling the concentrates of the respective components in the composition as well as operation parameters of the coating process. For example, in the case of the transfer coating process, the thickness of the film can be adjusted by controlling the coating speed. In the case of the spin coating process, the coating device can be selected according to the size of the substrate used, and the thickness of the film can be adjusted by controlling the rotating speed. The thickness of the film may vary depending upon intended applications. For example, the thickness of the film may be in the range of 100-2000 nm, 200-600 nm, 100-300 nm, 120-250 nm, and the like.

3) Crosslinking Reaction

In this step, the film of the composition is subjected to a light irradiation, typically UV light irradiation, such that the cholesteric LC polymerizable monomer and the nematic LC polymerizable monomer are crosslinked to produce a cholesteric LC polymer.

It should be understood that the crosslinking reaction may be performed with a photo mask being used to protect a portion of the film from irradiation, such that the resultant film of the composition comprises a plurality of alignment regions different in alignment direction. The photo mask may be in various shapes.

For example, the film of the composition may be prepared by the following procedure.

Firstly, a second alignment sublayer is prepared as follows. A cholesteric LC polymerizable monomer, a nematic LC polymerizable monomer and a photoinitiator are mixed together in a second predetermined mass ratio to form a second mixture. The second mixture is coated onto a substrate so as to form a film. A light irradiation is applied to the film while a photo mask is optionally used to cover a portion of the film, such that the cholesteric LC polymerizable monomer and the nematic LC polymerizable monomer subjected to irradiation are crosslinked. Optionally, the portion of the film covered by the photo mask is etched so as to form the second alignment sublayer, which has a second alignment direction, and optionally comprises a plurality of alignment regions.

Here, the second alignment sublayer may also be prepared by conventional technical means in the art, instead of using the composition of the present invention. For example, the second alignment sublayer may be prepared by a technical means known in the art and be imparted a certain alignment direction by a process commonly used in the art, such as a rubbing alignment method.

Subsequently, a first alignment sublayer is prepared as follows.

In the case that the second alignment sublayer having the second alignment direction does not comprise a plurality of alignment regions (which may be or not be prepared from the composition of the present invention), a cholesteric LC polymerizable monomer, a nematic LC polymerizable monomer and a photoinitiator are mixed together in a first predetermined mass ratio different from the second predetermined mass ratio, so as to form a first mixture. The first mixture is coated on the second alignment sublayer so as to form a film. A light irradiation is applied to the film while a photo mask having a predetermined pattern is used to cover a portion of the film, such that the cholesteric LC polymerizable monomer and the nematic LC polymerizable monomer subjected to irradiation are crosslinked. The portion of the film covered by the photo mask is then etched so as to form the first alignment sublayer, which has a first alignment direction, and comprises a plurality of alignment regions, wherein the first alignment direction is different from the second alignment direction. In this case, the alignment regions of the first alignment sublayer are separated from each other and arranged on the second alignment sublayer, as shown in FIG. 2.

In the case that the second alignment sublayer having the second alignment direction comprises a plurality of alignment regions, the first mixture as described above is coated on the exposed area of the substrate, so as to form a film. A light irradiation is applied to the film while a photo mask having a predetermined pattern is optionally used to cover a portion of the film, such that the cholesteric LC polymerizable monomer and the nematic LC polymerizable monomer subjected to irradiation are crosslinked, so as to form the first alignment sublayer, which has a first alignment direction and comprises a plurality of alignment regions, wherein the first alignment direction is different from the second alignment direction. In this case, the alignment regions of the first alignment sublayer and the alignment regions of the second alignment sublayer may be arranged alternately on the substrate, as shown in FIG. 1.

The first mass ratio and the second mass ratio may be determined according to the intended applications, and they are different from each other. For example, the mass ratio of the cholesteric LC polymerizable monomer to the nematic LC polymerizable monomer in the composition may be in the range of 5/95-95/5, for example, 10/90-90/10, 20/80-80/20, 30/70-70/30, and the like.

The amount of the photoinitiator in the composition is such an amount that is effective to allow the polymerizable monomers in the composition to be polymerized upon a light irradiation. For example, the amount of the photoinitiator is 1-10%, 2-9%, 3-7%, preferably 5%, based on the total mass of the cholesteric LC polymerizable monomer and the nematic LC polymerizable monomer.

The following procedure may be used to figure out whether the crosslinking reaction is complete.

A light irradiation is applied to a composition comprising the cholesteric LC polymerizable monomer and the nematic LC polymerizable monomer such that said monomers are polymerized to form a polymer. The polymer is weighed, and the weight is reported as A. Then the polymer is mixed with an organic solvent and the mixture is stirred sufficiently. The mixture is filtered and the deposit is dried. The dried deposit is weighed and the weight is reported as B. If B=A, the crosslinking reaction is complete. If B is smaller than A, the crosslinking reaction is incomplete, i.e., said monomers are not reacted completely.

Before the light irradiation, the temperature is adjusted to a temperature under which the cholesteric LC polymer may exhibit a cholesteric phase. Then the light irradiation is applied such that the polymerizable monomers are polymerized to form a polymer network. The configuration of the cholesteric LC mixture at this point is anchored by the polymer network. For example, the condition for the light irradiation may be determined by the following procedure: the temperature under which the cholesteric LC polymerizable monomer may exhibit a cholesteric phase is measured by using Differential scanning calorimetry (DSC), and then the condition for the light irradiation is determined according to the temperature measured.

LC Alignment Unit

In yet another aspect, the present invention provides a LC alignment unit comprising a substrate and an alignment layer of the present invention, wherein the alignment layer is disposed on the substrate.

The alignment layer comprises a plurality of alignment regions, wherein the adjacent alignment regions are different in alignment direction.

The alignment layer may comprise a first alignment sublayer and a second alignment sublayer, wherein the alignment direction of the first alignment sublayer is different from that of the second alignment sublayer.

Preferably, the first alignment sublayer and the second alignment sublayer respectively comprise a plurality of alignment regions separated from each other, and the alignment regions of the first alignment sublayer and the alignment regions of the second alignment sublayer are arranged alternately on the same surface of a substrate, such that the adjacent alignment regions of the alignment layer are different in alignment direction, as shown in FIG. 1.

Alternatively, the first alignment sublayer comprises a plurality of alignment regions, and the alignment regions of the first alignment sublayer are separated from each other and arranged on the surface of the second alignment sublayer opposite to the substrate, such that the adjacent alignment regions of the alignment layer are different in alignment direction, as shown in FIG. 2.

LC Display Panel

An embodiment of the present invention also provides a LC display panel comprising an array substrate, a color filter substrate and a LC layer provided between the array substrate and the color filter substrate, wherein a LC alignment unit of the present invention is provided on the side of the array substrate and/or the color filter substrate in contact with the LC layer.

Example 1

In this example, a composition, an alignment layer and a method for preparing the same are provided.

The composition of the present example comprises:

1,4-bis(4-(3'-methyl-6'-acryloxy hexyloxy)benzoyloxy) benzene represented by the following formula I as a cholesteric LC polymerizable monomer:

and benzil dimethyl ketal represented by the following formula III as a photoinitiator:

Formula III

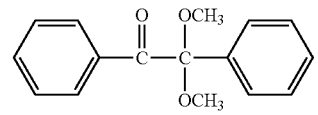

The amounts of the cholesteric LC polymerizable monomer, the nematic LC polymerizable monomer and the photoinitiator in the composition are 5.0%, 90.2% and 4.8% by mass, respectively.

The alignment layer of the present example was prepared from the above composition upon polymerization.

In particular, the method for preparing the alignment layer comprises the following steps:

Preparation of a conventional alignment layer (as a second alignment sublayer)

A conventional alignment layer was prepared on a glass substrate by a process known in the art (such as a transfer coating technique, a spin coating technique, and the like), and then was imparted an alignment direction by rubbing or light irradiating. It should be understood that the above conventional alignment layer may be imparted an alignment direction through other processes known in the art.

Preparation of an alignment layer of a cholesteric LC polymer (as a first sub-alignment layer)

1) Mixing

The cholesteric LC polymerizable monomer, the nematic LC polymerizable monomer and the photoinitiator were mixed together in the mass ratio as described above to form a composition having a pitch of 2048 nm (measured by Grandjean-Cano wedge Technique, see Smalyukh and O. D. Lavrentovich, Physical review E 66, 051703 (2002); 1-16).

2) Coating

When shielded from light, the composition was coated on the conventional alignment layer to form a film of the composition having a thickness of 256 nm.

3) Crosslinking Reaction

The film of the composition covered with a mask having a predetermined pattern was subjected Formula I

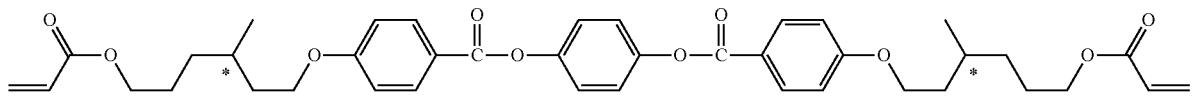

1,4-bis(4-(6'-acryloxy hexyloxy)benzoyloxy)-2-toluene represented by the following formula II as a nematic LC polymerizable monomer:

to a UV light irradiation at 5 mw/cm$^2$ for 40 minutes (min), such that the cholesteric LC polymerizable monomer and the nematic LC Formula II

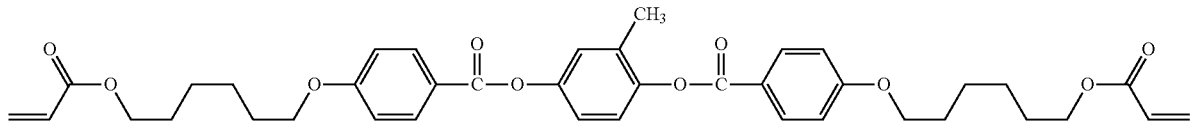

polymerizable monomer in the irradiated area of the film were crosslinked to form a cholesteric LC polymer.

The cholesteric LC polymerizable monomer and the nematic LC polymerizable monomer in the un-irradiated area of the film (in which area, the monomers were not reacted) were removed by using methylene chloride. Thus, an alignment layer of the cholesteric LC polymer (as the first alignment sublayer) was formed on the conventional alignment layer and the angle between the alignment directions thereof was 45°.

The alignment layer obtained thereby is shown in FIG. 2.

The alignment direction of the cholesteric LC polymer alignment layer is different from the alignment direction of the conventional alignment layer, which is advantageous to achieve a multi-domain display.

Example 1-1

It should be understood that the composition in Example 1 may be directly coated onto a glass substrate to form a film of the composition, which is then crosslinked to form a cholesteric LC polymer alignment layer.

Specifically, the composition in Example 1 was directly coated onto the glass substrate to form a film of the composition. Subsequently, the film of the composition covered with a mask having a predetermined pattern was subjected to a UV light irradiation at 5 mw/cm$^2$ for 40 min, such that the cholesteric LC polymerizable monomer and the nematic LC polymerizable monomer in the irradiated area of the film were crosslinked.

Thereafter, the cholesteric LC polymerizable monomer and the nematic LC polymerizable monomer in the un-irradiated area of the film (in which area, the monomers were not reacted) were removed by using methylene chloride. Thus, a first alignment sublayer having a first alignment direction was formed on the glass substrate.

Next, a composition comprising the cholesteric LC polymerizable monomer of formula I, the nematic LC polymerizable monomer of formula II and the photoinitiator of formula III (the amounts of which are respectively 19.6%, 78.4% and 2% by mass of the composition) was coated on the exposure area of the glass substrate (i.e., the area of the glass substrate exposed after being etched by methylene chloride). Then a light irradiation was applied to initiate a crosslinking reaction. Thereby a second alignment sublayer having an alignment direction different from the first alignment direction was formed.

The alignment layer obtained thereby is as shown in FIG. 1.

As can be seen from the example, the first alignment sublayer and the second alignment sublayer having alignment directions different from each other can be obtained by changing the mass ratio between the cholesteric LC polymerizable monomer and the nematic LC polymerizable monomer. The alignment regions of the first alignment sublayer and the alignment regions of the second alignment sublayer are arranged alternately on the glass substrate.

Since the alignment direction of the first alignment sublayer is different from that of the second alignment sublayer, a multi-domain display in one pixel is achieved.

Example 2

In this example, a composition, an alignment layer and a method for preparing the same are provided.

The composition of the present example comprises:

1,4-bis(4-(3'-methyl-6'-acryloxy hexyloxy)benzoyloxy) benzene represented by the following formula I as a cholesteric LC polymerizable monomer:

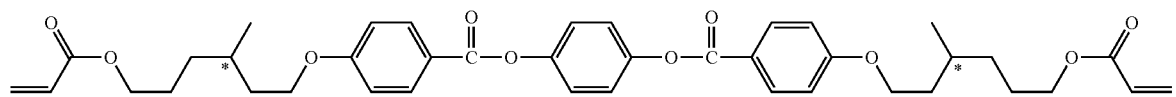

Formula I 1,4-bis(4-(6'-acryloxy hexyloxy)benzoyloxy)-2-toluene represented by the following formula II as a nematic LC polymerizable monomer:

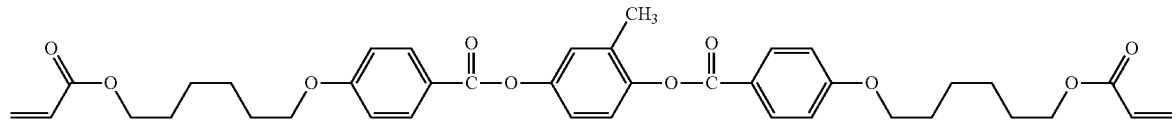

Formula II and benzil dimethyl ketal represented by the following formula III as a photoinitiator:

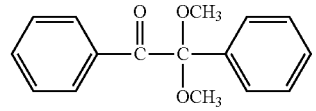

Formula III

The amounts of the cholesteric LC polymerizable monomer, the nematic LC polymerizable monomer and the photoinitiator in the composition are 20.0%, 75.2%, and 4.8% by mass, respectively.

The alignment layer of the present example is prepared from the above composition upon polymeration reaction.

In particular, the method for preparing the alignment layer comprises the following steps:

Preparation of a conventional alignment layer

A conventional alignment layer was prepared on a glass substrate by a process known in the art, and then was imparted an alignment direction by rubbing.

Preparation of a cholesteric LC polymer alignment layer

1) Mixing

The cholesteric LC polymerizable monomer, the nematic LC polymerizable monomer and the photoinitiator were mixed together in the mass ratio as described above to form a composition having a pitch of 512 nm (measured by Bragg reflection technique).

2) Coating

When shielded from light, the composition was coated onto the conventional alignment layer to form a film of the composition having a thickness of 128 nm.

3) Crosslinking Reaction

The film of the composition covered with a mask having a predetermined pattern was subjected to a UV light irradiation at 5 mw/cm$^2$ for 40 min, such that the cholesteric LC polymerizable monomer and the nematic LC polymerizable monomer in the irradiated area of the film were crosslinked to form a cholesteric LC polymer.

The cholesteric LC polymerizable monomer and the nematic LC polymerizable monomer in the un-irradiated area of the film (in which area, the monomers were not reacted) were removed by using methylene chloride. Thus, an alignment layer of the cholesteric LC polymer was formed on the conventional alignment layer and the angle between the alignment directions thereof was 90°. It should be understood that the alignment direction of the conventional alignment layer may be an alignment layer having an alignment direction imparted by rubbing or by other processes known in the art.

The alignment direction of the cholesteric LC polymer alignment layer is different from the alignment direction of the conventional alignment layer, which is advantageous to achieve a multi-domain display.

Example 2-1

It should be understood that the composition in Example 2 may be directly coated onto a glass substrate to form a film of the composition, which is then crosslinked to form a cholesteric LC polymer alignment layer. The procedure of Example 2-1 is similar to that of Example 1-1, except that the amounts of the cholesteric LC polymerizable monomer of formula I, the nematic LC polymerizable monomer of formula II and the photoinitiator of formula III are respectively 9.7%, 87.4% and 2.9% by mass of the composition.

Example 3

In this example, a composition, an alignment layer and a method for preparing the same are provided.

The composition of the present example comprises:

1,4-bis(4-(3'-methyl-6'-acryloxy hexyloxy)benzoyloxy)benzene represented by the following formula I as a cholesteric LC polymerizable monomer:

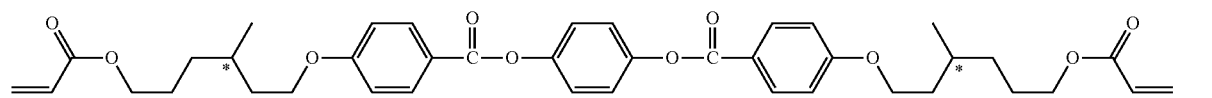

Formula I 1,4-bis(4-(6'-acryloxy hexyloxy)benzoyloxy)-2-toluene represented by the following formula II as a nematic LC polymerizable monomer:

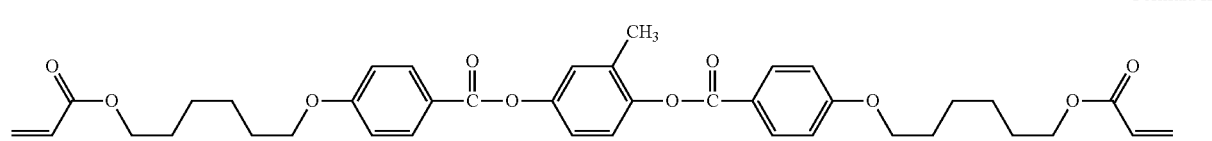

Formula II and
benzil dimethyl ketal represented by the following formula III as a photoinitiator:

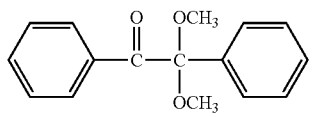

Formula III

The amounts of the cholesteric LC polymerizable monomer, the nematic LC polymerizable monomer and the photoinitiator in the composition are 50.0%, 45.2% and 4.8% by mass, respectively.

The alignment layer of the present example was prepared from the above composition upon polymerization.

In particular, the method for preparing the alignment layer comprises the following steps:

Preparation of a conventional alignment layer

A conventional alignment layer was prepared on a glass substrate by a process known in the art, and then was imparted an alignment direction by rubbing.

Preparation of a cholesteric LC polymer alignment layer

1) Mixing

The cholesteric LC polymerizable monomer, the nematic LC polymerizable monomer and the photoinitiator were mixed together in the mass ratio as described above to form a composition having a pitch of 480 nm (measured by Grandjean-Cano wedge Technique).

2) Coating

When shielded from light, the composition was coated on the conventional alignment layer to form a film of the composition having a thickness of 240 nm.

3) Crosslinking Reaction

The film of the composition covered with a mask having a predetermined pattern was subjected to a UV light irradiation at 5 mw/cm² for 40 min, such that the cholesteric LC polymerizable monomer and the nematic LC polymerizable monomer in the irradiated area of the film were crosslinked to form a cholesteric LC polymer.

The cholesteric LC polymerizable monomer and the nematic LC polymerizable monomer in the un-irradiated area of the film (in which area, the monomers were not reacted) were removed by using methylene chloride. Thus, an alignment layer of the cholesteric LC polymer was formed on the conventional alignment layer and the angle between the alignment directions thereof was 180°. It should be understood that the alignment direction of the conventional alignment layer may be imparted by rubbing or by other processes known in the art.

The alignment direction of the cholesteric LC polymer alignment layer is different from the alignment direction of the conventional alignment layer, which is advantageous to achieve a multi-domain display.

Example 3-1

It should be understood that the composition in Example 3 may be directly coated onto a glass substrate to form a film of the composition, which is then crosslinked to form a cholesteric LC polymer alignment layer. The procedure of Example 3-1 is similar to that of Example 1-1, except that the amounts of the cholesteric LC polymerizable monomer of formula I, the nematic LC polymerizable monomer of formula II and the photoinitiator of formula III are respectively 65.5%, 28% and 6.5% by mass of the composition.

Example 4

In this example, a composition, an alignment layer and a method for preparing the same are provided.

The composition of the present example comprises:

1,4-bis(4-(3'-methyl-6'-acryloxy hexyloxy)benzoyloxy) benzene represented by the following formula I as a cholesteric LC polymerizable monomer:

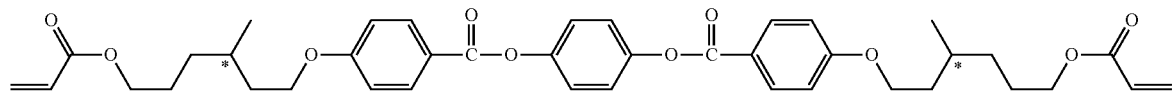

Formula I 1,4-bis(4-(6'-acryloxy hexyloxy)benzoyloxy)-2-toluene represented by the following formula II as a nematic LC polymerizable monomer:

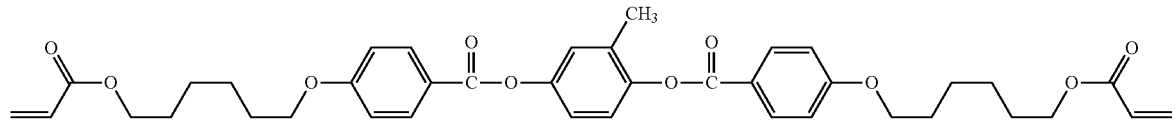

Formula II and
benzil dimethyl ketal represented by the following formula III as a photoinitiator:

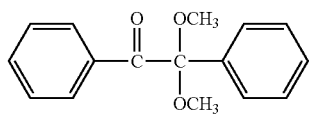

Formula III

The amounts of the cholesteric LC polymerizable monomer, the nematic LC polymerizable monomer and the photoinitiator in the composition are 90.2%, 5.0% and 4.8% by mass, respectively.

The alignment layer of the present example was prepared from the above composition upon polymerization.

In particular, the method for preparing the alignment layer comprises the following steps:

Preparation of a conventional alignment layer

A conventional alignment layer was prepared on a glass substrate by a process known in the art, and then was imparted an alignment direction by rubbing.

Preparation of a cholesteric LC polymer alignment layer

1) Mixing

The cholesteric LC polymerizable monomer, the nematic LC polymerizable monomer and the photoinitiator were mixed together in the mass ratio as described above to form a composition having a pitch of 380 nm (measured by Grandjean-Cano wedge Technique).

2) Coating

When shielded from light, the composition was coated on the conventional alignment layer to form a film of the composition having a thickness of 285 nm.

3) Crosslinking Reaction

The film of the composition covered with a mask having a predetermined pattern was subjected to a UV light irradiation at 5 mw/cm$^2$ for 40 min, such that the cholesteric LC polymerizable monomer and the nematic LC polymerizable monomer in the irradiated area of the film were crosslinked to form a cholesteric LC polymer.

The cholesteric LC polymerizable monomer and the nematic LC polymerizable monomer in the un-irradiated area of the film (in which area, the monomers were not reacted) were removed by using methylene chloride. Thus, an alignment layer of the cholesteric LC polymer was formed on the conventional alignment layer and the angle between the alignment directions thereof was 270°. It should be understood that the alignment direction of the conventional alignment layer may be imparted by rubbing or by other processes known in the art.

The alignment direction of the cholesteric LC polymer alignment layer is different from the alignment direction of the conventional alignment layer, which is advantageous to achieve a multi-domain display.

Example 4-1

It should be understood that the composition in Example 4 may be directly coated onto a glass substrate to form a film of the composition, which is then crosslinked to form a cholesteric LC polymer alignment layer. The procedure of Example 4-1 is similar to that of Example 1-1, except that the amounts of the cholesteric LC polymerizable monomer of formula I, the nematic LC polymerizable monomer of formula II and the photoinitiator of formula III are respectively 27.5%, 64.2% and 8.3% by mass of the composition.

Example 5

In this example, an alignment unit is provided, which comprises an alignment layer 3 disposed on a glass substrate 1, as shown in FIG. 1. The alignment layer 3 comprises two alignment sublayers of cholesteric LC polymers prepared from two compositions of the present invention different in component concentration.

In particular, the alignment layer 3 comprises a plurality of alignment regions 31 and 32, and the adjacent alignment regions are different in alignment direction. A first alignment sublayer (i.e., the first alignment sublayer in Example 1-1) consists of the plurality of alignment regions 31, and a second alignment sublayer (i.e., the second alignment sublayer in Example 1-1) consists of the plurality of alignment regions 32. Adjacent first alignment region 31 and second alignment region 32 are provided within a single pixel length. In the alignment layer 3 that directly contacts with the glass substrate, the LC molecules in the plurality of alignment regions 31 have the same alignment direction, and the LC molecules in the plurality of alignment regions 32 have the same alignment direction, but the alignment direction of the alignment regions 31 is different from that of the alignment regions 32. The alignment regions 31 and the alignment regions 32 are arranged alternately on the glass substrate, thereby LC molecules having more than one primary alignment directions are formed in one pixel and thus a multi-domain display is obtained. As shown in FIG. 1, L2 represents the length of an alignment region 31 in the alignment layer 3, and L1 represents the length of one pixel. A 10-domain display is obtained in one pixel length L1.

It should be understood that the number of domains depends upon the number of the alignment regions 31, 32 provided in one pixel length L1.

The alignment unit as shown in FIG. 1 can be obtained by applying only two light irradiations. The pattern of the masks used during the two irradiations may be determined according to the desired shape of the alignment regions.

Example 6

In this example, an alignment unit is provided, which comprises a first alignment sublayer 3 and a second alignment sublayer 2. The first alignment sublayer 3 and the second alignment sublayer 2 are respectively the first alignment sublayer and the conventional alignment layer prepared in Example 1. As shown in FIG. 2, the first alignment sublayer 3 comprises a plurality of alignment regions 31. Unlike Example 5, the alignment regions 31 of the first alignment sublayer 3 are separated from each other and disposed on the second alignment sublayer 2. The alignment direction of the second alignment sublayer 2 is different from the alignment direction of the alignment regions 31 of the first alignment sublayer 3. The second alignment sublayer 2 is disposed on the glass substrate 1.

As shown in FIG. 2, the alignment regions 31 have one same alignment direction. The alignment direction 33 of the alignment regions 31 of the first alignment sublayer 3 is different from the alignment direction 22 of the second alignment sublayer 2. Thereby LC molecules having more than one primary alignment directions are formed in one pixel and thus a multi-domain display is obtained.

It should be understood that the alignment regions 31 may have different alignment directions 33, that is to say, the alignment regions 31 may be formed by several passes using different masks such that the alignment regions 31 have more than one alignment directions.

Figure 3:
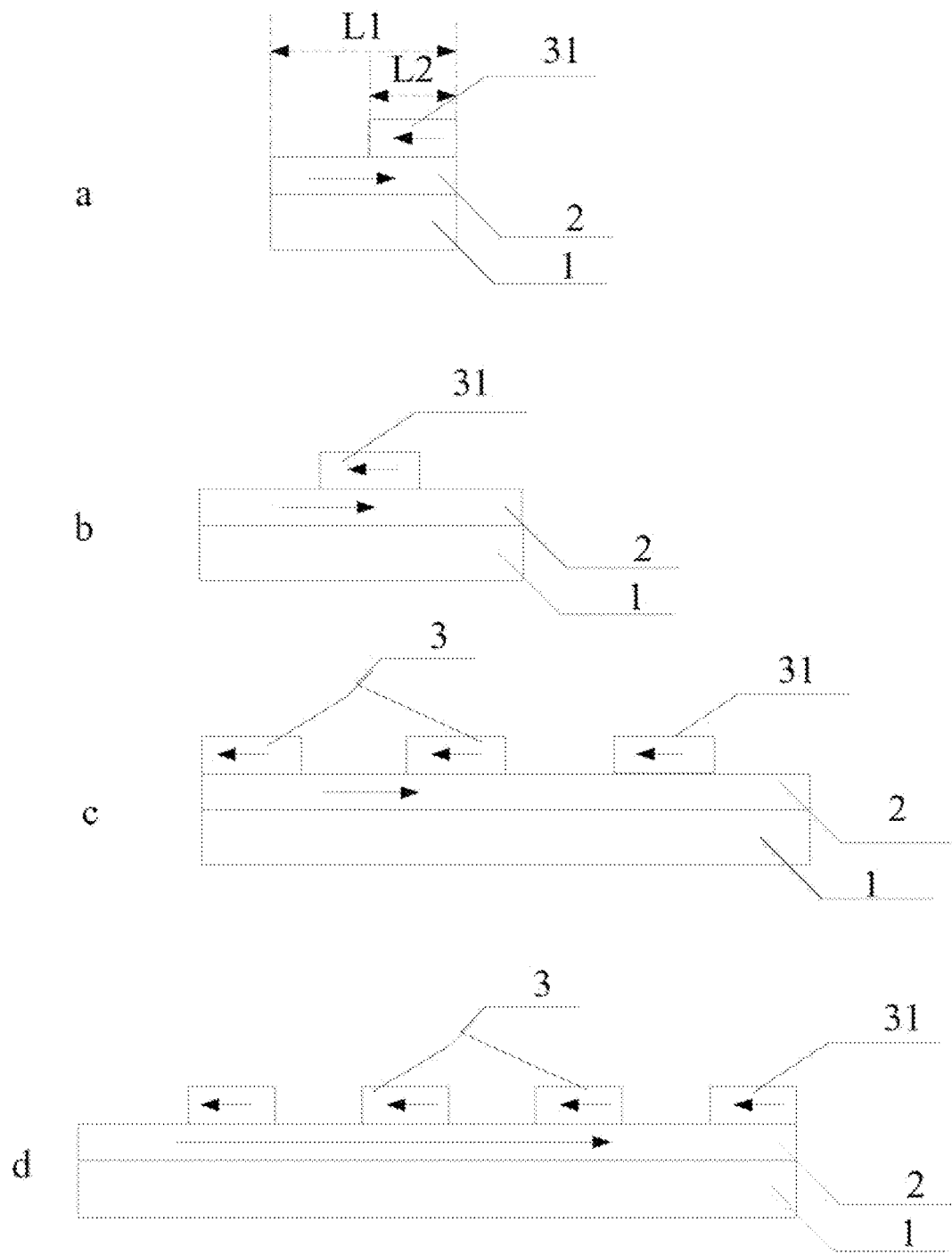
FIG. 3 is a schematic diagram showing achievement of a multi-domain display by adjusting the alignment region length of an alignment layer within the length of a single pixel according to the present invention.

As shown in FIG. 3, a multi-domain display can be achieved by adjusting the length of an alignment region 31 (L2) of the first alignment sublayer 3 relative to the length of one pixel (L1).

When L2=L½, in a single pixel, a half of the LC molecules exhibit the alignment direction of the alignment regions 31, and the other half of the LC molecules exhibit the alignment direction of the second alignment sublayer 2, that is to say, the LC molecules exhibit two primary alignment directions in a single pixel, and thus a two-domain LC display is achieved, as shown in FIG. 3a.

When L2=L⅓, the LC molecules exhibit three primary alignment directions in a single pixel, and thus a three-domain LC display is achieved, as shown in FIG. 3b.

When L2=L⅙, the LC molecules exhibit six primary alignment directions in a single pixel, and thus a six-domain LC display is achieved, as shown in FIG. 3c.

When L2=L⅛, the LC molecules exhibit eight alignment directions in a single pixel, and thus a eight-domain LC display is achieved, as shown in FIG. 3d.

Therefore, when L2=L1/n (n is a positive integer), the LC molecules exhibit n primary alignment directions in a single pixel, and thus a multi-domain display is achieved. In addition, the size of each alignment region of the first alignment sublayer 3 may be adjusted by modifying the size of the mask used.

The alignment unit as shown in FIG. 2 may be prepared by one or more light irradiations, and the pattern of the masks used in the light irradiations may be selected according to the desired shape of the alignment regions.

Figure 4:
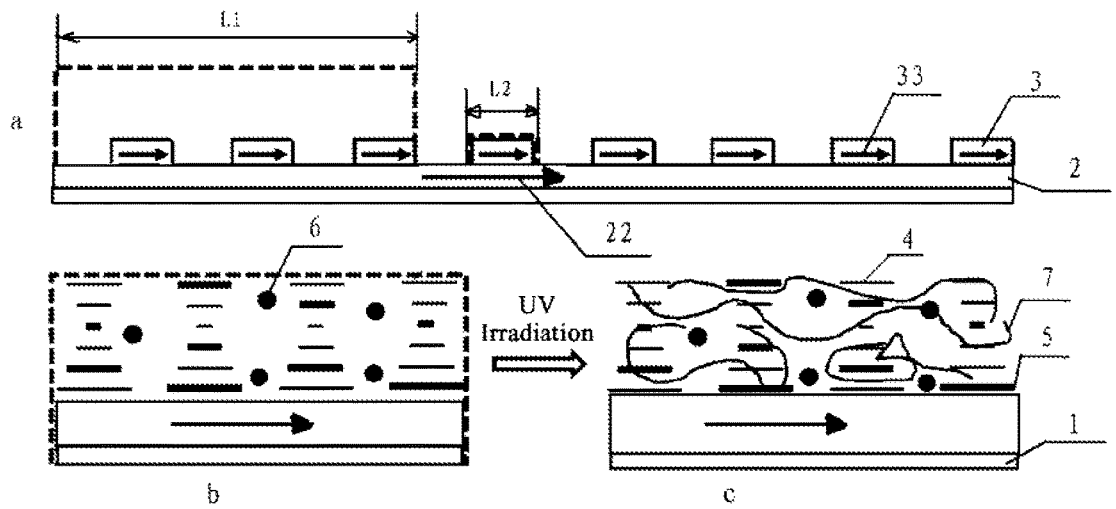
FIG. 4 is a schematic diagram showing the changes of molecular distribution in an alignment layer of an alignment unit before and after being subjected to a light irradiation according to the present invention.

The alignment unit comprising the first alignment sublayer 3 and the second alignment sublayer 2 (i.e., the conventional alignment layer) as described above may be prepared by forming the first alignment sublayer 3 on the conventional alignment layer. By way of example, the process for forming an alignment unit comprising two alignment sublayers is described below with reference to FIG. 4 and the process for forming a cholesteric LC polymer alignment layer (i.e., the first alignment sublayer 3).

As shown in FIG. 4a, a second alignment sublayer 2 (i.e., the second alignment sublayer 2 in Example 1) having an alignment direction 22 horizontally to the right was formed on a glass substrate according to a process known in the art. A first alignment sublayer 3 was formed on the second alignment sublayer 2 through the same procedure as described in Example 1 with respect to the cholesteric LC polymer alignment layer (i.e., the first alignment sublayer). In the length of a single pixel (L1), the first alignment sublayer 3 comprised three alignment regions separated from each other, which were formed by using one same mask upon once UV light irradiation. In said length of a single pixel (L1), the first alignment sublayer 3 and the second alignment sublayer 2 formed a 6-domain display. It should be understood that the shorter the length of each alignment region is, the more the number of domains is.

The molecular distribution of the first alignment sublayer 3 and the second alignment sublayer 2 in the length L2 is shown in FIG. 4b. FIG. 4c is a schematic diagram showing the molecular distribution of the cholesteric LC polymer alignment layer (i.e., the first alignment sublayer 3) after being subjected to a light irradiation as shown in FIG. 4b, wherein the composition for forming the first alignment sublayer 3 comprises the cholesteric LC polymerizable monomer 4, the nematic LC polymerizable monomer 5 and the photoinitiator 6, and the first alignment sublayer 3 formed upon a UV light irradiation comprises the cholesteric LC polymer 7.

Figure 5:
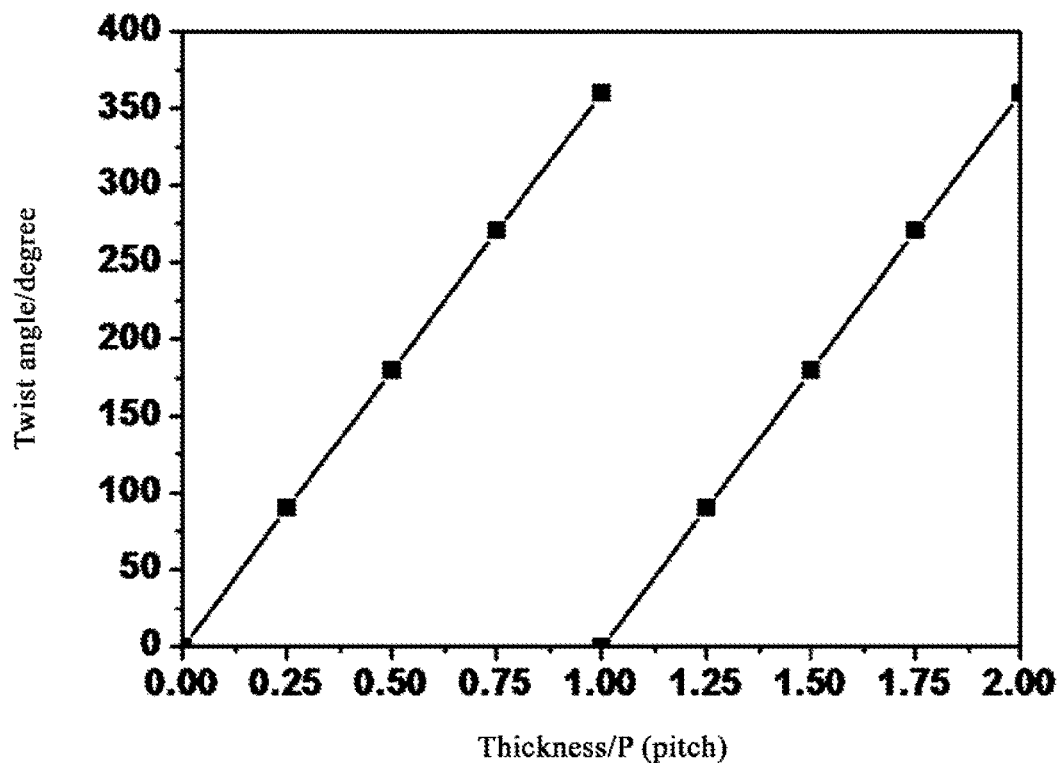
FIG. 5 is a schematic diagram showing the changes of alignment direction of an alignment layer in an alignment unit depending upon the thickness (expressed by pitch) of the alignment layer according to Example 6 of the present invention.

When the amount of the cholesteric LC polymerizable monomer in the composition for forming the first alignment sublayer 3 is constant, the alignment direction of the first alignment sublayer 3 varies depending upon the thickness of the first alignment sublayer 3, that is to say, the alignment direction of the first alignment sublayer 3 may be controlled by adjusting the thickness of the first alignment sublayer 3. In particular, as shown in FIG. 5, when the amount of the cholesteric LC polymerizable monomer in the composition is constant (i.e., the pitch, P, is constant), the alignment direction of the first alignment sublayer 3 varies depending upon the thickness thereof. The alignment direction (expressed by a twist angle) of the first alignment sublayer 3 gradually rotates a certain degree with the increase of the thickness (expressed by pitch) of the first alignment sublayer 3. The twist angle cycles from 0 degree to 360 degree with each increase of one pitch in thickness.

Figure 6:
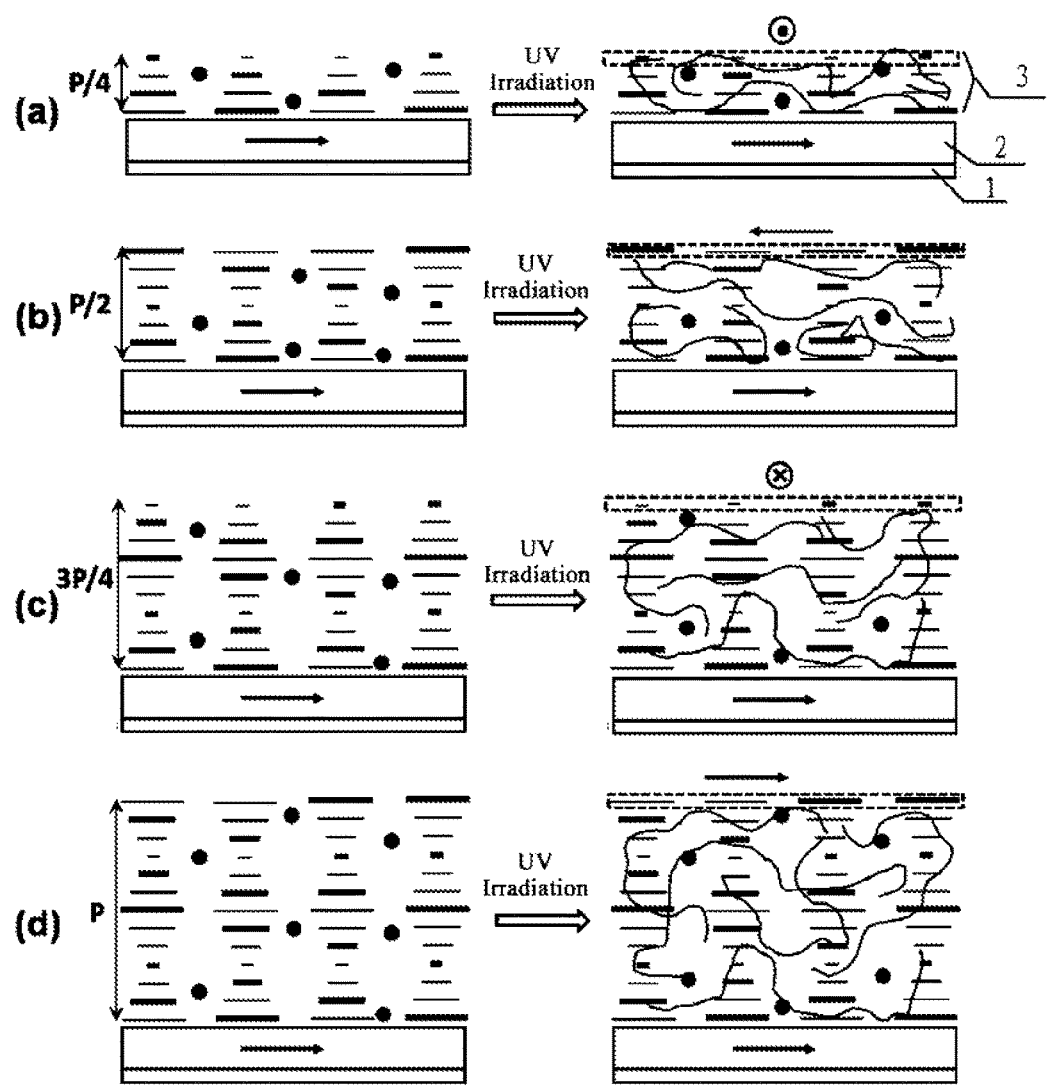
FIG. 6 is a schematic diagram showing the changes of alignment directions of the alignment layers having different thicknesses (expressed by pitch) before and after being subjected to a UV light irradiation according to Example 6 of the present invention.

FIG. 6 is a schematic diagram showing the changes of the alignment directions of the alignment layers having different thicknesses (expressed by pitch) before and after being subjected to a UV light irradiation. For example, when the thickness of the alignment layer d satisfies d=(n+0.25) P (n is an integer), the alignment direction of the cholesteric LC polymer alignment layer (i.e., the first alignment sublayer 3), after being subjected to a UV light irradiation, deviates from the alignment direction of the conventional alignment layer at an angle of 90 degree, as shown in FIG. 6 (a). When the thicknesses of the alignment layer d satisfies d=(n+0.5) P (n is an integer), the alignment direction of the cholesteric LC polymer alignment layer, after being subjected to a UV light irradiation, deviates from the alignment direction of the conventional alignment layer at an angle of 180 degree, as shown in FIG. 6 (b). When the thicknesses of the alignment layer d satisfies d=(n+0.75) P (n is an integer), the alignment direction of the cholesteric LC polymer alignment layer, after being subjected to a UV light irradiation, deviates from the alignment direction of the conventional alignment layer at an angle of 270 degree, as shown in FIG. 6 (c). When the thicknesses of the alignment layer d satisfies d=n P (n is an integer), the alignment direction of the cholesteric LC polymer alignment layer, after being subjected to a UV light irradiation, deviates from the alignment direction of the conventional alignment layer at an angle of 360 degree, as shown in FIG. 6 (d).

In other words, when the components of the composition and the component amounts are constant, alignment regions with various thicknesses may be obtained, thereby alignment regions having various alignment directions may be obtained and a multi-domain display is achieved.

Example 7

In this example, a LC display panel is provided, which comprises an array substrate, a color filter substrate and a LC layer provided between the array substrate and the color filter substrate. A LC alignment unit is provided on the side of the array substrate and/or the color filter substrate in contact with the LC layer, wherein the LC alignment unit comprises the alignment layer prepared in any of the above examples. Since the LC alignment unit comprises a plurality of alignment regions in the length of one pixel and the adjacent alignment regions are different in alignment direction, a multi-domain LC display is achieved.

It should be understood that the above embodiments of the invention have been disclosed only for illustrating the principle of the present invention, but they are not intended to limit the present invention. Obviously, the person skilled in the art can make various modifications and variations of the invention without departing from the spirit and scope of the invention, thus the modifications and variations of the invention are included within the scope of the present invention.

The invention claimed is:

1. A composition for forming an alignment layer of a multi-domain display, consisting of a nematic liquid crystal polymerizable monomer, a cholesteric liquid crystal polymerizable monomer, and a photoinitiator, wherein the cholesteric liquid crystal polymerizable monomer is 1,4-bis(4-(3'-methyl-6'-acryloxy hexyloxy) benzoyloxy) benzene, as represented by the following Formula I:

Formula I

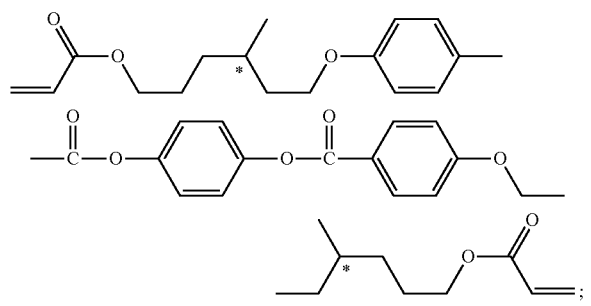

and the nematic liquid crystal polymerizable monomer is 1,4-bis(4-(6'-acryloxy hexyloxy) benzoyloxy)-2-toluene, as represented by the following Formula II:

Formula II

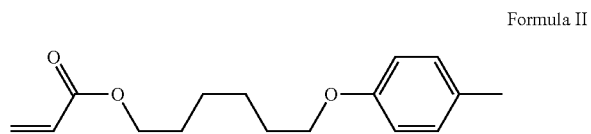

-continued

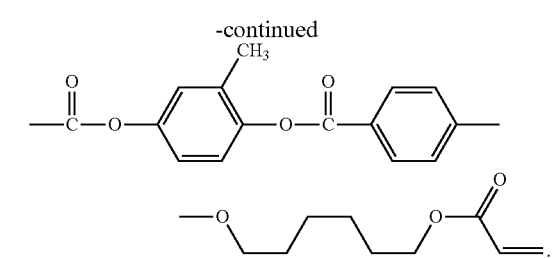

2. The composition of claim 1, characterized in that the mass ratio of the cholesteric liquid crystal polymerizable monomer to the nematic liquid crystal polymerizable monomer in the composition is in the range of 5/95-95/5.

3. The composition of claim 1, characterized in that the amount of the photoinitiator in the composition is in the range of 1-10% based on the total mass of the cholesteric liquid crystal polymerizable monomer and the nematic liquid crystal polymerizable monomer.

4. The composition of claim 3, characterized in that the photoinitiator is benzil dimethyl ketal.

5. An alignment layer, characterized in that at least a part of the alignment layer is prepared from a composition according to claim 1.

6. The alignment layer of claim 5, characterized in that the alignment layer comprises a plurality of alignment regions, wherein the adjacent alignment regions are different in alignment direction.

7. A method for preparing an alignment layer according to claim 5, characterized in that the method comprises the steps of:
   1) mixing, in which a cholesteric liquid crystal polymerizable monomer, a nematic liquid crystal polymerizable monomer and a photoinitiator are mixed together in a predetermined ratio to form a composition, wherein the cholesteric liquid crystal polymerizable monomer is 1,4-bis(4-(3'-methyl-6'-acryloxy hexyloxy) benzoyloxy) benzene, as represented by the following Formula I:

Formula I

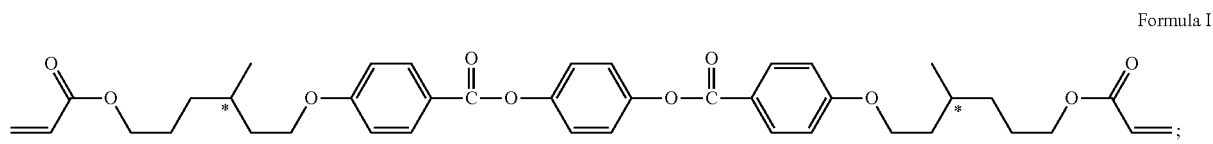

and the nematic liquid crystal polymerizable monomer is 1,4-bis(4-(6'-acryloxy hexyloxy) benzoyloxy)-2-toluene, as represented by the following Formula II:

Formula II

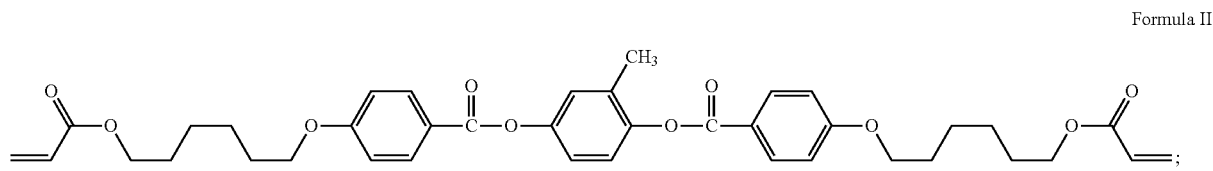 [SMILES: C=CC(=O)OCCCCCCOc1ccc(C(=O)Oc2ccc(OC(=O)c3ccc(OCCCCCCOC(=O)C=C)cc3)c(C)c2)cc1]

2) coating, in which the composition is coated onto a substrate, so as to form a film of the composition;
   3) crosslinking reaction, in which a light irradiation is applied to the composition such that the cholesteric liquid crystal polymerizable monomer and the nematic liquid crystal polymerizable monomer are crosslinked to produce a cholesteric liquid crystal polymer.

8. The method of claim 7, characterized in that the light irradiation is a UV light irradiation.

9. A liquid crystal alignment unit, characterized in that the liquid crystal alignment unit comprises a substrate and an alignment layer disposed on the substrate, wherein at least a part of the alignment layer is formed from the composition according to claim 1.

10. The liquid crystal alignment unit of claim 9, characterized in that the alignment layer comprises a plurality of alignment regions, wherein the adjacent alignment regions are different in alignment direction.

11. The liquid crystal alignment unit of claim 9, characterized in that the alignment layer comprises a first alignment sublayer having a first alignment direction and a second alignment sublayer having a second alignment direction, wherein the first alignment sublayer comprises a plurality of alignment regions;

wherein the second alignment sublayer is disposed on the substrate, and the plurality of alignment regions of the first alignment sublayer are separated from each other and arranged on the surface of the second alignment sublayer opposite to the substrate; and wherein the first alignment direction of the first alignment sublayer is different from the second alignment direction of the second alignment sublayer, and at least one of the first alignment sublayer and the second alignment sublayer is prepared from the composition.

12. The liquid crystal alignment unit of claim 9, characterized in that the alignment layer comprises a first alignment sublayer having a first alignment direction and a second alignment sublayer having a second alignment direction, wherein the first alignment sublayer comprises a plurality of alignment regions and the second alignment sublayer comprises a plurality of alignment regions;

wherein the plurality of alignment regions of the first alignment sublayer and the plurality of alignment regions of the second alignment sublayer are arranged alternately on the same surface of the substrate;

wherein the first alignment direction of the first alignment sublayer is different from the second alignment direction of the second alignment sublayer, and at least one of the first alignment sublayer and the second alignment sublayer is prepared from the composition.

13. A liquid crystal display panel, characterized in that the liquid crystal display panel comprises an array substrate, a color filter substrate and a liquid crystal layer provided between the array substrate and the color filter substrate, wherein a liquid crystal alignment unit is provided on the side of the array substrate and/or the color filter substrate in contact with the liquid crystal layer, wherein the liquid crystal alignment unit comprises an alignment layer, and at least a part of the alignment layer is formed from the composition according to claim 1.

\* \* \* \* \*